United States Patent [19]

Froning et al.

[11] Patent Number: 4,983,197
[45] Date of Patent: Jan. 8, 1991

[54] METHOD FOR PRODUCING WAVEGUIDES IN A GLASS SUBSTRATE BY ION EXCHANGE

[76] Inventors: Edilbert A. K. Froning, Bodanstr. 23, 7772 Oberubldingeu; Klaus A. Langner, Alte Dorfstrasse 61, 7770 Überlingeu, both of Fed. Rep. of Germany

[21] Appl. No.: 382,845

[22] Filed: Jul. 20, 1989

[30] Foreign Application Priority Data

Aug. 9, 1988 [DE] Fed. Rep. of Germany ....... 3826942

[51] Int. Cl.⁵ .............................................. C03C 21/00
[52] U.S. Cl. ..................................... 65/30.13; 65/3.14
[58] Field of Search .............................. 65/3.14, 30.13

[56] References Cited

U.S. PATENT DOCUMENTS

| | | | |
|---|---|---|---|
| 3,836,348 | 9/1974 | Sumimoto et al. | 65/30.13 |
| 3,879,110 | 4/1975 | Furukawa | 65/30.13 X |
| 4,285,988 | 8/1981 | Ernsberger | 65/30.13 X |
| 4,286,052 | 8/1981 | Ernsberger | 65/30.13 X |
| 4,400,052 | 8/1989 | Alferness et al. | 65/30.13 X |
| 4,711,514 | 12/1987 | Tangonan et al. | 65/30.13 X |

FOREIGN PATENT DOCUMENTS

3440390A1 5/1985 Fed. Rep. of Germany .
3702317A1 8/1988 Fed. Rep. of Germany .

*Primary Examiner*—Robert L. Lindsay
*Attorney, Agent, or Firm*—Lee, Mann, Smith, McWilliams & Sweeney

[57] ABSTRACT

A method for producing waveguides in a glass substrate by ion exchange comprises the method steps of: (a) applying a metal mask (44) on the glass substrate (42), this metal mask (44) leaving open the areas of the waveguides (72,74) to be provided, (b) bringing the glass substrate (42) into contact with molten metallic salt which comprises the ions to be exchanged for the ions of the glass substrate (42), (c) interconnecting by means of electrical conductors surface areas (90,92,94,96) of the metal mask (44) that are separated from each other. The surface areas (90,92,94,96) of the metal mask (44) are electrically conductively interconnected through bond wires (98). Furthermore, the surface areas (90,92,94,96) are electrically conductively connected to a metallic vessel (12) which contains the molten metal.

4 Claims, 3 Drawing Sheets

METHOD FOR PRODUCING WAVEGUIDES IN A GLASS SUBSTRATE BY ION EXCHANGE

TECHNICAL FIELD

The invention relates to a method for producing waveguides in a glass substrate by ion exchange, with the method steps of:
(a) applying a metal mask on the glass substrate, this metal mask leaving open the areas of the waveguides to be provided,
(b) bringing the glass substrate into contact with molten metallic salt which comprises the ions to be exchanged for the ions of the glass substrate.

BACKGROUND ART

It is known to produce optical waveguides in plane-parallel plates, in which waveguides light is guided by total reflection. To this end, structures have to be provided in the plane-parallel plate, which structures have a refractive index which is larger than the refractive index of the material of the plate. It is known to provide such an increased refractive index by causing an ion exchange in the material, through which ions in the material of the plate are replaced by ions having a larger ion radius. The surface of the plate is covered by means of a mask except for those areas in which the refractive index shall be increased. The plate is heated to an increased temperature and brought into contact with appropriate substances. Then an ion exchange takes place and, thus, the refractive index is increased in the areas which are not covered by the mask.

U.S. Pat. No. 3,857,689 describes the production of an integrated optical circuit with which a mask is applied to a plane-parallel plate (substrate), which mask defines the desired optical pattern. Then the plate is brought into a bath of molten salt. This molten salt comprises monovalent positive ions which have a larger influence on the refractive index than the positive ions in the material of the plate. It is ensured that an ion exchange takes place through which positive ions of the plate are replaced by ions of the molten salt. This leads to an increase of the refractive index in the areas near the surface which are not covered by the mask and which are exposed to the molten salt.

From Japanese patent application No. 58-118 609 it is known to support the ion exchange by applying an electrical field. In the method described therein, a mask and then a thin silver layer is applied by vacuum-metallizing to a plane-parallel plate. An anode of chrome is applied to the silver layer. A cathode of aluminum is provided on the opposite side. The plate is heated and, simultaneously, a voltage is applied between the anode and the cathode. By means of the electrical field, silver ions are transported into the material of the plate. Thereby, an optical waveguide having an increased refractive index compared to the plate is produced in the areas which are not covered by the mask.

Furthermore, it is known to hold a plane-parallel plate in a horizontal position through a suction bell which communicates with a vacuum, which plate shall be provided with waveguides. A supply of molten salt is contained in the suction bell. The side of the plane-parallel plate remote from the suction bell is provided with a mask. This side of the plate is plunged into a further supply of the molten salt. An electrical field is applied to the molten salt through electrodes. Also, here, positive ions of a larger diameter diffuse from the lower supply of molten salt into the plate and thereby provide optical waveguides having an increased refractive index in the uncovered areas, while, on the other hand, ions having a smaller diameter emerge from the material of the plate into the molten salt on the upper side of the plate.

Furthermore, it is known to hold a plane-parallel plate vertically. Cups are placed with corresponding sealing surfaces on both sides of the plate such that cavities are formed on both sides of the plate. These cavities are limited by a surface of the plate on a vertical side face and are open at the top. Molten salt is filled into these cavities. The cups carry an anode and a cathode, respectively, such that an electrical field is generated through the molten salt and the plate. Again, the plate carries a mask on the side of the anode.

From the (not pre-published) German Patent Application No. P 38 02 837.9 a device for carrying out field-supported ion exchange in plane-parallel plates is known in which the plates are clamped between two supporting bodies of metal. The supporting bodies form cavities on both sides of the plate, which cavities are open towards the plate. The cavities are surrounded by closed sealing surfaces which engage the plate. Supply vessels for molten salt communicate with the lower ends of the cavities through filling supply conduits. Venting conduits extend from the cavities.

When certain structures are produced, e.g. ring resonator structures, mask areas electrically insulated from each other remain on the glass substrate. It has been found that, in these cases, the formed waveguides have considerable deficiencies.

DISCLOSURE OF INVENTION

It is the object of the invention to produce waveguides free from such deficiencies also in the cases in which mask areas appear which are electrically insulated from each other.

According to the invention this object is achieved in that
(c) surface areas of the metal mask separated from each other are electrically conductively interconnected.

Surprisingly, it has been found that the quality of the produced waveguide thereby can be considerably improved. Presumably, with the prior are methods, due to potential differences, electrical currents flow between the surface areas insulated from each other through the electrically conductive metallic salt surface directly over the surface of the glass substrate in which the ion exchange shall take place. The ion exchange is hindered by these currents. This effect is prevented by the electrically conductive connection of the surface areas. The potentials of the surface areas are equalized through this connection.

Embodiments of the invention will now be described in greater detail with reference to the accompanying drawings.

BEST MODE OF CARRYING OUT THE INVENTION

Figure 1:
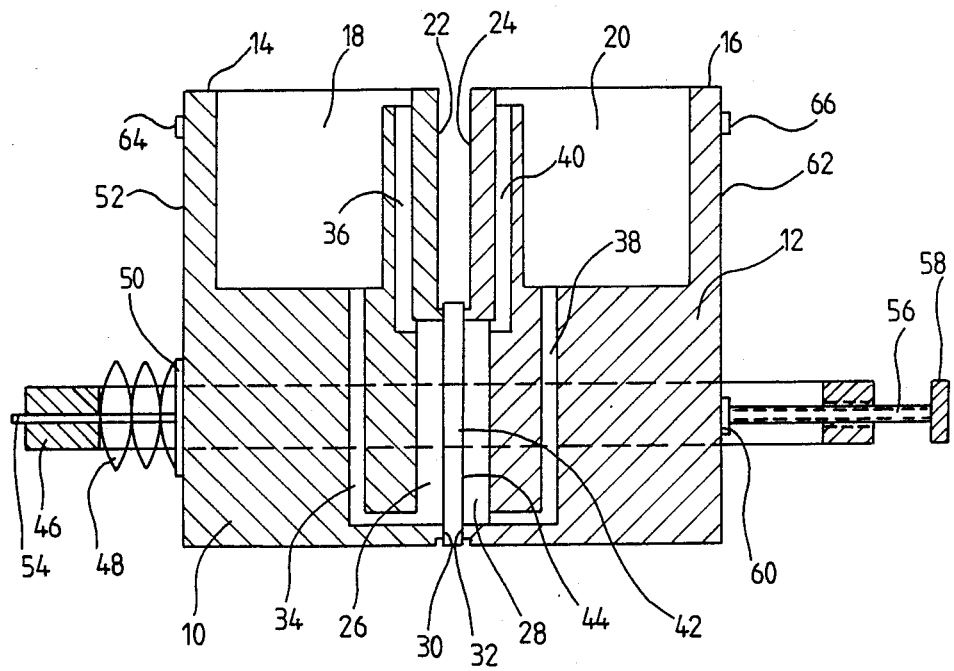
FIG. 1 shows schematically a longitudinal section through a device for carrying out an ion exchange in a plane-parallel plate.

The device comprises two substantially corresponding supporting bodies 10 and 12. The supporting bodies 10 and 12 are substantially cuboid. The two supporting bodies 10 and 12, respectively, each form a supply vessel 18 and 20, respectively, for molten salt at their upper front surfaces 14 and 16. The supply vessels 18 and 20 are open at the top.

Recesses forming cavities 26 and 28, respectively, are provided in the side surfaces 22 and 24 facing each other of the supporting bodies 10 and 12, respectively. Sealing surfaces 30 and 32, respectively, are formed all around the cavities 26 and 28. The sealing surfaces 30 and 32 are machined very exactly to have a level surface. The sealing surfaces 30 and 32 jut out slightly with regard to the side surfaces 22 and 24, respectively.

The cavity 26 communicates with the supply vessel 18 through a filling supply conduit 34. The filling supply conduit 34 starts from the bottom of the supply vessel 18 and ends at the lower end of the cavity 26. A venting conduit 36 starts from the upper end of the cavity 26. The venting conduit 36 is guided along the wall of the supply vessel 18 and ends in the upper portion of the supply vessel closely below its upper edge, i.e. the upper front surface 14.

In a corresponding way, the cavity 28 communicates with the supply vessel 20 through a filling supply conduit 38. The filling supply conduit 38 starts from the bottom of the supply vessel 18 and ends at the lower end of the cavity 28. A venting conduit 40 starts from the upper end of the cavity 28. The venting conduit 40 is guided along the wall of the supply vessel 20 and ends in the upper portion of the supply vessel 20 closely below its upper edge, i.e. the upper front surface 16.

The bottoms of the supply vessels 18 and 20 are located above the upper ends of the cavities 26 and 28, respectively. In this way, it is ensured that the cavities 26 and 28 are filled to the top with molten salt, provided that there is still molten salt in the supply vessels 18 and 20, respectively.

A plane-parallel plate 42 is held between the two supporting bodies 10 and 12. On its side facing the supporting body 12, i.e. the right side in the figure, the plate 42 carries a mask 44 of a material which prevents the ion exchange in the areas covered by the mask 44. The sealing surfaces 30 and 32 closely engage the surfaces of the plate 42.

The two supporting bodies are made of an electrically conductive material, i.e. metal. They are held together by a clamp 46 in the illustrated embodiment. A set of disk springs 48 are supported on the clamp 46 on the left side in FIG. 1, which disk springs 48 engage through an insulation 50 the side surface 52 of the supporting body 10 facing the side surface 22. A centering pin 54 at the insulation 50 provides for centering the insulation 50, the disk springs 48 and the clamp 46.

On the opposite side a threaded spindle 56 is guided into the clamp 46. This threaded spindle 56 is adjustable by means of an adjusting knob 58. This threaded spindle 56 engages through an insulating piece 60 the side surface 62 of the supporting body 12 facing the side surface 24. In this way, the two supporting bodies 10 and 12 are pressed against the plate 42 with well-defined force. The threaded spindle 56 allows adjustment of this compression force. The disk springs 48 prevent the compression force from becoming too large which can cause damage to the plate 42.

The supporting body 10 is connected to the negative terminal 64 of a voltage source and, thus, constitutes a cathode. The supporting body 12 is connected to the positive terminal 66 of the voltage source and forms the anode.

The described arrangement operates as follows:

The plate 42 is clamped between the two supporting bodies 10 and 12. The sealing surfaces 30 and 32 of the supporting bodies 10 and 12, respectively, engage the surfaces of the plate 42 on opposite sides along the edges of the plate. The sealing surfaces 30 and 32 are aligned with each other such that no moments of flexion become effective at the plate 42. Therefore, the plate cannot be deformed "like a paper bag" as in known devices. Thus, the sealing surfaces can be pressed by the threaded spindle 56 and the springs 48 against the surfaces of the plate 42 with sufficient force such that a reliable sealing is attained all around the plate.

The supply vessels 18 and 20 are filled with molten salt which comprises positive ions which shall be exchanged for other ions in the material of the plate 42. This molten salt flows through the filling supply conduits 34 and 38 into the cavities 26 and 28, respectively. The air in the cavities 26 and 28 is vented through the venting conduits 36 and 40, respectively. Therefore, a perfect filling of the cavities with molten salt is ensured without the formation of bubbles. The cavities 26 and 28 are closely sealed. Thus, no molten salt can creep along at the surface of the plate and make a conductive connection between the two sides of the plate 42, as is the case in another known arrangement.

A voltage is applied between the supporting bodies 10 and 12 such that positive ions pass, under the action of the electrical field, from the molten salt in the supply vessel 20 through the similarly heated plate 42 in the areas left free by the mask 44 and displace ions having a smaller ion diameter which then reach the molten salt in the cavity 26. Structures, particularly waveguides, which have an increased refractive index compared to the material of the plate 42, then arise in the areas left free by the mask 44.

Figure 2:
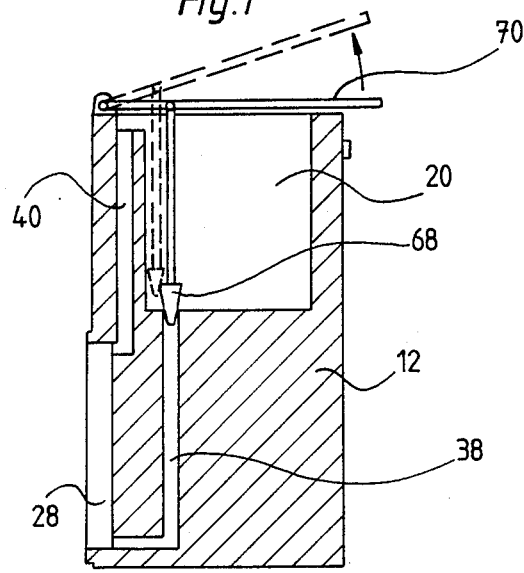
FIG. 2 shows a side view of a supporting body in the device of FIG. 1, in which the filling supply conduit can be closed by a plug until the exchange temperature is attained.
Figure 4:
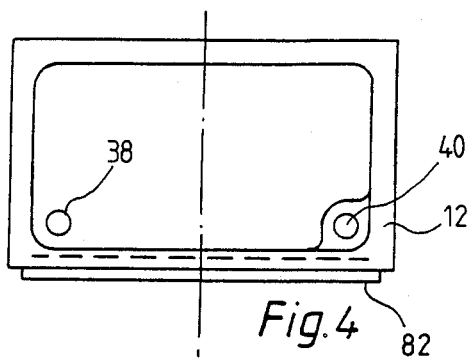
FIG. 4 shows a plan view of the supporting body of FIGS. 2 and 3.
Figure 3:
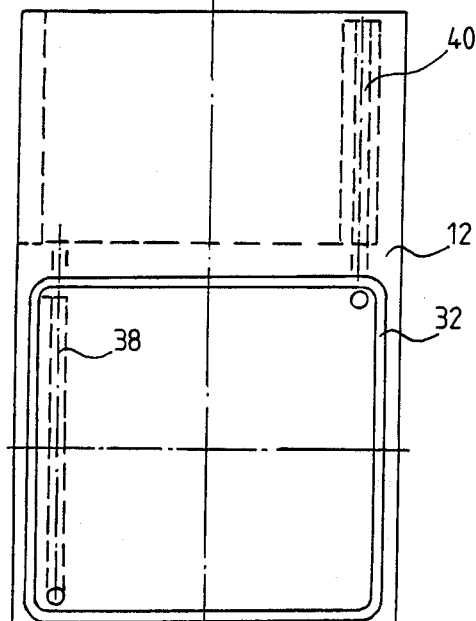
FIG. 3 shows a view of a supporting body in the device of FIG. 1 from the side of the plate to be treated looking from the left in FIG. 2.

In order to obtain well-defined time courses for the field-supported ion exchange, it is desirable not to bring the melt into contact with the glass substrate, i.e. the plate 42, during the run-up phase of the furnace. The run-up phase is the time between attaining the melting temperature of the melt and attaining the actual exchange temperature. For this reason, the filling supply conduit 38 is at first closed by a plug 68, as indicated in FIG. 2. The plug 68 can be pulled out by means of a mechanism 70, as schematically indicated in FIG. 2. The plug is a simple cone of the same material as the remaining device. The plug is slightly pressed in for sealing.

The plug 68 is pulled out when the exchange temperature is attained and immediately before the field is applied.

Figures 5, 6:
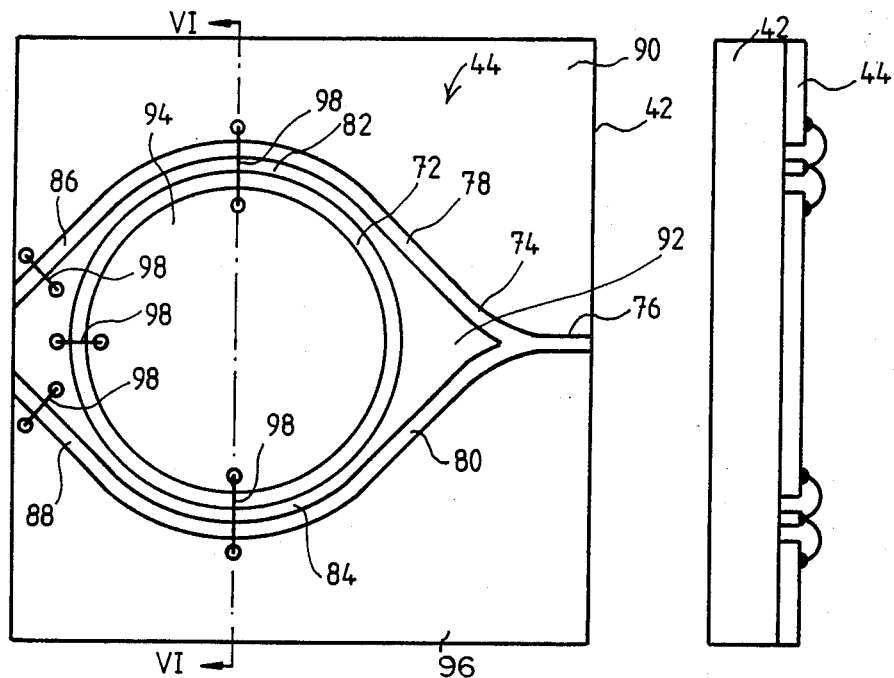
FIG. 5 is a side view looking from the left in FIG. 1 showing a glass substrate with an example of a waveguide structure which can be produced by means of a device according to FIGS. 1 through 4 with the surface areas, electrically insulated from each other, of the metal mask defining the waveguide structure being electrically interconnected through bond wires.
FIG. 6 shows a section through the substrate taken along the line VI—VI of FIG. 5.

The surface of the glass substrate 42, having a metal mask 44 for the production of waveguides for a ring resonator is illustrated in FIG. 5. The waveguide structure comprises a circular waveguide 72, which is closed, and a forked waveguide arrangement 74. The waveguide arrangement 74 has an inlet end 76 and is subsequently branched in a v-shape at this inlet end 76 into two branches 78 and 80. The two branches 78 and 80 extend around the circular waveguide 72 on opposite sides. The two branches 78 and 80 extend in a central area at a small distance from the circular waveguide 72 and form couplers 82 and 84 therewith. The branches 78 and 80 then extend to outlet ends 86 and 88, respectively. In the operation of the finished waveguide structure, a light wave is introduced through the inlet end 76. This light wave is coupled into the circular waveguide 72 through the coupler 82 and 84 for circulation counter-clockwise and clockwise, respectively. Light can be simultaneously coupled out from the circular waveguide through the couplers 82 and 84. This waveguide structure is known per se and therefore is not discussed in detail here. For producing this waveguide structure the metal mask 44 has corresponding slots through which the ion exchange takes place between the surface of the glass substrate 42 and the molten metallic salt in the space 28.

As can be seen in FIG. 5, the metal mask 44 is divided into a total of four surface areas 90, 92, 94 and 96 which are electrically insulated against each other. The problems arising thereby with regard to the quality of the produced waveguide are avoided in that these surface areas 90, 92, 94 and 96 are interconnected through bridges of bond wires 98. Useful bond wires are known components and used in the semiconductor industry for bonding components. Bond wires of gold have proved to be worthwhile in potassium ion exchange with aluminum-masked glasses. Thereby, the different surface areas 90, 92, 94 and 96 are electrically interconnected such that they are at the same potential. The quality of the produced waveguide is considerably improved by this measure.

The surface areas 90, 92, 94 and 96 are not only electrically conductively interconnected but also electrically conductively connected to the vessel which contains the molten metal. This is achieved by means of the arrangement of FIG. 1 wherein the supporting body 12 with the sealing surface 32 engages the surface areas 90 and 96 of the metal mask 44, which, in turn, are connected to the "islands" 92 and 94 through the bond wires 98.

Figures 7, 8:
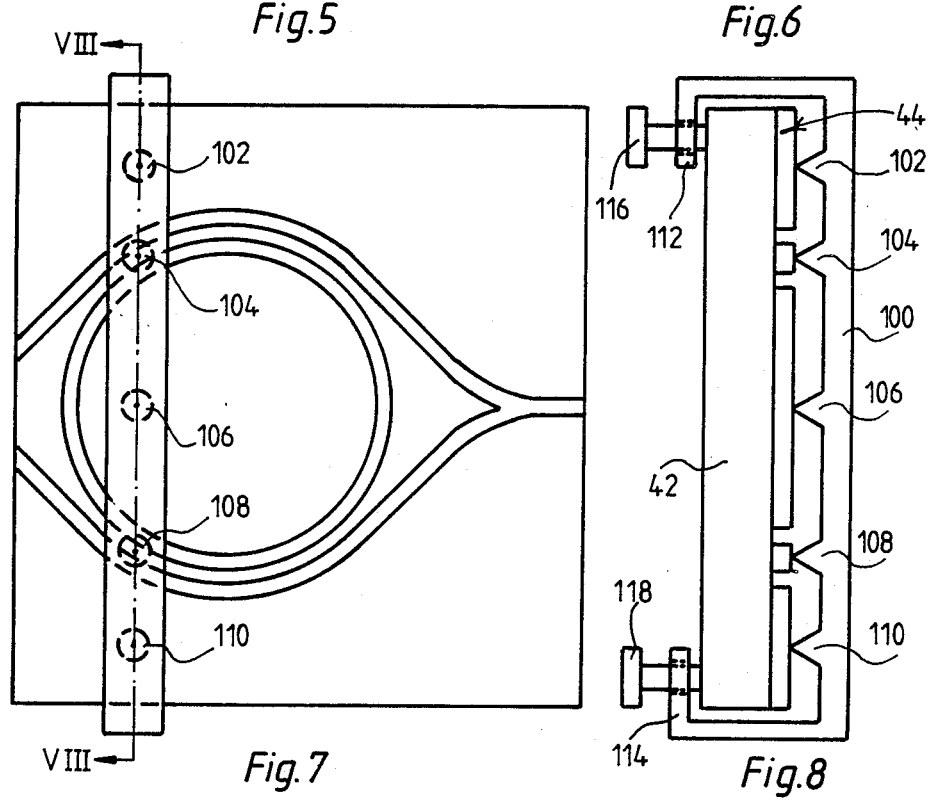
FIG. 7 shows, in an illustration similar to FIG. 5, a modified type of the connection of the electrically insulated surface areas, namely by means of a yoke.
FIG. 8 shows a section taken along the line VIII—VIII of FIG. 7.

In the embodiment of FIGS. 7 and 8 the waveguide structure of the waveguide to be produced is the same as in the embodiment of FIGS. 5 and 6. Corresponding elements are designated by the same numerals as there. According to FIGS. 7 and 8, the electrical connection of the different surface areas is effected by a yoke 100 of electrically conductive material. This yoke 100 engages the surface portions 90, 92, 94 and 96 with projections 102, 104, 106, 108 and 110 and thus provides an electrical connection between these surface portions. The yoke 100 has ends 112 and 114 bent-off inwards, which extend about opposite edges of the glass substrate 42. Clamping screws 116 and 118, respectively, are guided into the ends 112 and 114. The clamping screws 116 and 118 are supported at the back of the glass substrate. By means of these screws 116,118 the yoke 100 is tightened against the metal mask 44.

What is claimed is:

1. A method of providing waveguides in a glass substrate by ion exchange, comprising the steps of
   (a) applying a metal mask to the surface of said glass substrate, said metal mask having lands covering said surface and apertures in which said surface is exposed, part of said lands being separated from other of said lands by apertures therebetween,
   (b) interconnecting said separated lands by electrical conductors different from said lands to establish equal electrical potentials on all said lands of said metal mask, and
   (c) bringing said glass substrate and said mask into contact with molten metallic salt which contains ions of a first type to be exchanged for ions of a second type in said glass substrate, whereby ions of said first type are exchanged for ions of said second type in said exposed surface to change the refractive index of said glass substrate below said exposed surface and thereby to provide said waveguides.

2. A method as claimed in claim 1, wherein bond wires are used as said electrical conductors.

3. A method as claimed in claim 1, wherein, during said ion exchange process, an electrically conductive yoke is clamped to said substrate on the side of said mask, said yoke having projections which contact said lands.

4. A method as claimed in claim 1, wherein said molten metallic salt is contained in an electrically conductive vessel and said separated lands are all electrically connected to said vessel.

* * * * *